Patented Sept. 8, 1953

2,651,629

UNITED STATES PATENT OFFICE 2,651,629

CELLULOSE ESTERS

Blanche B. White, Summit, and Elisabeth Barabash, New Providence, N. J., assignors to Celanese Corporation of America, New York, N. Y., a corporation of Delaware No Drawing. Application July 1, 1949,
Serial No. 102,716

3 Claims. (Cl. 260—225)

This invention relates to the production of mixed organic acid esters of cellulose and relates more particularly to an improved process for the production of mixed organic acid esters of cellulose containing lower aliphatic acid acyl groups and acyl groups of normally solid higher aliphatic acids.

An object of this invention is to provide an improved process for the production of mixed organic acid esters of cellulose containing both lower and higher aliphatic acid acyl groups.

Another object of this invention is the provision of a process for the production of mixed organic acid esters of cellulose containing both lower and higher aliphatic acid acyl groups by the direct esterification of cellulose with a mixture of lower and higher aliphatic acid anhydrides.

Other objects of this invention will appear from the following detailed description.

Mixed organic acid esters of cellulose containing both lower aliphatic acid acyl groups and higher aliphatic acid acyl groups, such as cellulose acetate-stearate, for example, have heretofore been prepared by several different procedures. One method commonly employed has been to react cellulose with acetic anhydride to form cellulose acetate, the latter then ripened to the desired acyl value so as to free hydroxyl groups for further esterification, after which reaction is caused to take place between the ripened cellulose acetate thus obtained and a suitable stearylating agent, such as stearic chloride or anhydride. Alternatively, cellulose has been partially esterified with stearyl chloride, the cellulose stearate formed washed and dried and then further esterified with acetic anhydride or other lower aliphatic acid anhydride depending upon the mixed ester desired. These processes each involve a number of separate steps and treatments and are not, of course, as economical as a process wherein the desired esterification may be achieved directly.

We have now found that mixed organic acid esters of cellulose containing acyl groups of both lower aliphatic acids and higher aliphatic acids containing at least 10 carbon atoms may be obtained directly if the cellulose to be esterified is pretreated to activate the same and the activated cellulose then esterified with an esterification mixture comprising a lower aliphatic acid anhydride, the anhydride of a higher aliphatic acid containing at least 10 carbon atoms, an esterification catalyst and a solvent for the mixed organic acid ester of cellulose formed. At the completion of the desired esterification, the esterification catalyst is neutralized, and the mixed cellulose ester precipitated from solution by the addition of water to the esterification mixture.

While the novel process of our invention will be more particularly described in connection with the preparation of cellulose acetate-stearate, it is to be understood that other mixed organic acid esters of cellulose may also be prepared in like manner employing the necessary esterifying agents. Examples of other mixed organic acid esters of cellulose which may be formed in accordance with our invention are cellulose acetate-oleate, cellulose acetate-palmitate, cellulose-acetate-laurate, cellulose acetate-linoleate, cellulose propionate-stearate, cellulose propionate-oleate, cellulose propionate-palmitate, cellulose propionate-laurate, cellulose propionate-linoleate, cellulose butyrate-stearate, cellulose butyrate-oleate, cellulose butyrate-palmitate, cellulose butyrate-laurate and cellulose butyrate-linoleate.

Thus, in the preparation of cellulose acetate-stearate, for example, one part by weight of cellulose is pretreated by agitating the same with a mixture of 0.25 to 1.5 parts by weight of glacial acetic and 0.5 to 5% by weight on the cellulose of concentrated sulfuric acid for ¼ to 2 hours at a temperature of 20 to 35° C. to activate the same. The desired esterification of the pretreated cellulose is then effected by entering the same into an esterification mixture comprising 1.5 to 2.0 parts by weight of stearic anhydride, up to a total of 10% on the weight of the cellulose of concentrated sulfuric acid, and 0.5 to 1.5 parts by weight of acetic anhydride in 8 to 12 parts by weight of a water-immiscible solvent for the mixed ester. Water-immiscible solvents such as ethylene chloride, benzene or methylene chloride are suitable. Additional acetic anhydride is preferably added to the reaction mixture as esterification proceeds in amount sufficient to yield a total of 2 to 4 parts by weight. The esterification is carried out at a temperature of 30 to 50° C., with stirring, the reaction being continued until the reaction mixture is clear and free of unesterified fibers. The esterification is usually completed in a total reaction time of from 3 to 6 hours. The catalyst present in the clear solution of the mixed ester may then be neutralized by the addition thereto of sodium carbonate, magnesium acetate, magnesium oxide, magnesium carbonate or other basic salt either in aqueous solution or as the solid. The cellulose acetate-stearate formed is then precipitated from the neutralized solution by the addition of the reaction mixture to boiling water. The water-immiscible solvent is boiled off, the soft cellulose acetate-stearate flake which remains is separated and the separated flake then washed with hot aqueous, preferably 70%, ethyl alcohol to remove any stearic acid present thereon as well as the excess of stearic anhydride remaining. Cellulose acetate-stearates having 4 to 5% combined stearic acid and 55 to 58% combined acetic acid may be readily obtained by our direct esterification procedure.

Thus, in preparing cellulose acetate-stearate having the above proportions of combined acetic acid and stearic acid, for each mol of cellulose undergoing esterification there is employed in the esterification reaction from about 0.4 to 0.6 mols of stearic anhydride and from about 4 to 5 mols of acetic anhydride.

To obtain mixed cellulose acetate-stearates having a proportion of combined stearic acid higher than that mentioned above, the amount of stearic anhydride employed in the esterification reaction mixture is increased. Where such mixed cellulose acetate-stearates are desired, for each mol of cellulose undergoing esterification, the esterification reaction mixture may contain, for example from 1 to 2 mols of stearic anhydride, preferably about 1.5 mols, and from 3 to 5 mols of acetic anhydride.

Preferably, the reaction is initiated in every instance, with all of the stearic anhydride present in the esterification reaction mixture to which the preheated cellulose is added together with about one-third of the total acetic anhydride to be employed. The remainder of the acetic anhydride, as brought out above, is added during the course of the esterification reaction.

In order further to illustrate our invention, but without being limited thereto, the following examples are given:

*Example I*

162 parts by weight of cotton linters (1 mol) are pretreated by being shaken for 2 hours with a mixture of 162 parts by weight of glacial acetic acid (2.7 mols) and 8 parts by weight of concentrated sulfuric acid. The pretreated cotton linters, without separation of the pretreating solution, are then entered into an esterification bath consisting of 324 parts by weight of stearic anhydride (0.6 mols), 162 parts by weight of acetic anhydride (1.5 mols) and 1620 parts by weight of ethylene dichloride maintained at 35° C. At the end of 1.5 hours, 162 parts by weight (1.5 mols) of acetic anhydride are added to the reaction mixture. The reaction is allowed to proceed for 3 hours after this addition and then another 162 parts by weight of acetic anhydride together with 2 parts by weight of sulfuric acid are added. The esterification reaction is allowed to proceed further for a total reaction time of 6 hours, with stirring, at which time the reaction mixture is clear and free of unesterified fibers. The sulfuric acid present is neutralized by the addition of solid sodium carbonate to the clear reaction mixture and the dissolved cellulose acetate-stearate is then precipitated from solution by the addition of the reaction mixture to boiling water. The ethylene dichloride is then boiled off leaving the cellulose acetate-stearate in the form of a soft flake. The water is separated and the flake washed several times with hot, aqueous 70% ethyl alcohol to remove the stearic acid formed and the excess stearic anhydride. The cellulose acetate-stearate flakes are finally extracted with ethyl ether and dried. The cellulose acetate-stearate obtained contains 0.05 stearyl groups, 2.65 acetyl groups and 0.3 free hydroxyl groups per glucose residue, the stearyl content being 4.8%, calculated as stearic acid.

*Example II*

100 parts by weight of cotton linters are mixed with 25 parts by weight of glacial acetic acid and stirred very rapidly for five minutes with strong agitation. A mixture of 10 parts by weight of glacial acetic acid and 5 parts by weight of concentrated sulfuric acid in 100 parts by weight of ethylene dichloride is added to the cotton linters and the resulting mixture again strongly stirred for about 10 minutes. The foregoing steps constitute a pretreatment of the cellulose to render the same more amenable to esterification.

A mixture of 800 parts by weight of ethylene dichloride, 500 parts by weight of stearic anhydride and 65 parts by weight of acetic anhydride is then added to the pretreated cellulose and the resulting mixture is maintained at a temperature of 45° C. for 1½ hours. At this point, 65 parts by weight of acetic anhydride are added and the esterification reaction continued for a further period of 2 hours when an additional 65 parts by weight of acetic anhydride are added along with 1.25 parts by weight of sulfuric acid. Esterification is completed in 3 hours after the final addition of acetic anhydride. The sulfuric acid catalyst present is then neutralized by the addition of sodium carbonate to the esterification mixture and the cellulose acetate-stearate in solution precipitated by the addition of the esterification reaction mixture to boiling water. The ethylene dichloride is boiled off, the soft fiber of cellulose acetate-stearate separated, washed several times with hot aqueous 70% ethyl alcohol to remove stearic acid and stearic anhydride and then extracted with diethyl ether and dried. The cellulose acetate-stearate obtained contains 0.14 stearyl groups, 2.19 acetyl group and 0.67 free hydroxyl groups per glucose residue, the stearyl content being 12.8%, calculated as stearic acid.

It is to be understood that the foregoing detailed description is given merely by way of illustration and that many variations may be made therein without departing from the spirit of our invention.

Having described our invention, what we desire to secure by Letters Patent is:

1. Process for the production of cellulose acetate-stearate, which comprises pretreating cellulose with a mixture of glacial acetic acid and sulfuric acid, reacting each mol of the pretreated cellulose with an esterification mixture comprising 1 to 2 mols of acetic anhydride, 0.4 to 2.0 mols of stearic anhydride, sulfuric acid and a water-immiscible solvent for the cellulose acetate-stearate, adding from 2 to 3 mols of additional acetic anhydride to the reaction mixture during the reaction, allowing the esterification reaction to proceed until the esterification reaction mixture is clear, and then precipitating the cellulose acetate-stearate formed from solution.

2. Process for the production of cellulose acetate-stearate, which comprises pretreating cellulose with a mixture of glacial acetic acid and sulfuric acid, reacting each mol of the pretreated cellulose at a temperature of 30 to 50° C. with an esterification mixture comprising 1 to 2 mols of acetic anhydride, 0.4 to 2.0 mols of stearic anhydride, sulfuric acid and a water-immiscible solvent for the cellulose acetate-stearate, adding from 2 to 3 mols of additional acetic anhydride to the reaction mixture during the reaction, allowing the esterification reaction to proceed at a temperature of 30 to 50° C. until the esterification reaction mixture is clear, and then precipitating the cellulose acetate-stearate formed from solution by adding the esterification reaction mixture to water.

3. Process for the production of cellulose acetate-stearate, which comprises pretreating cellulose with a mixture of 25 to 150% on the weight of the cellulose of glacial acetic acid and 0.5 to 5% by weight of sulfuric acid, reacting each mol of the pretreated cellulose at a temperature of 30 to 50° C. with an esterification mixture comprising 1 to 2 mols of acetic anhydride, 0.4 to 2.0 mols of stearic anhydride, 4 to 10% on the weight of the cellulose of sulfuric acid and a water-immiscible solvent for the cellulose acetate-stearate, adding from 2 to 3 mols of additional acetic anhydride to the reaction mixture during the reaction, allowing the esterification reaction to proceed at a temperature of 30 to 50° C. until the esterification reaction mixture is clear, and then precipitating the cellulose acetate-stearate formed from solution by adding the esterification reaction mixture to boiling water.

BLANCHE B. WHITE.
ELISABETH BARABASH.

References Cited in the file of this patent

UNITED STATES PATENTS

| Number | Name | Date |
|---|---|---|
| 1,704,282 | Clarke et al. | Mar. 5, 1929 |
| 2,010,829 | Staud et al. | Aug. 13, 1935 |
| 2,033,820 | Dreyfus | Mar. 10, 1936 |
| 2,170,016 | Fordyce et al. | Aug. 22, 1939 |
| 2,208,569 | Blanchard | July 23, 1940 |
| 2,342,415 | Malm | Feb. 22, 1944 |
| 2,345,406 | Malm | Mar. 28, 1944 |
| 2,353,423 | Tinsley | July 11, 1944 |
| 2,376,422 | Drefus | May 22, 1945 |